Oct. 20, 1959        G. ROTHE        2,909,102
GEAR MILLING MACHINE
Filed Feb. 9, 1956
Fig. 1.
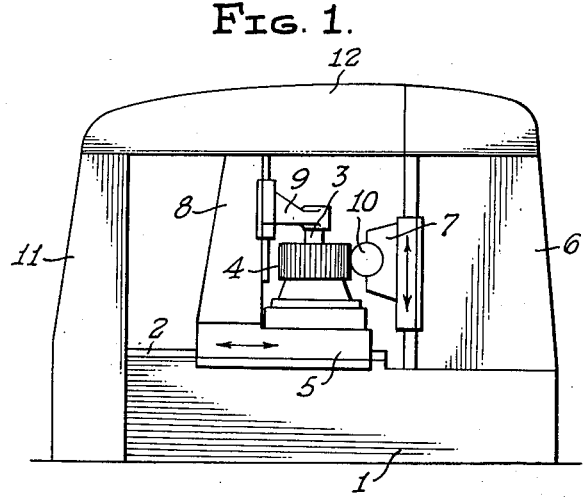
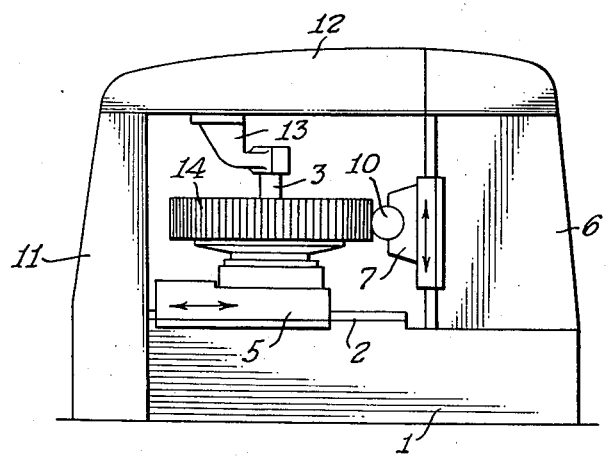
Fig. 2.
INVENTOR
GERHARD ROTHE
BY Bailey, Stephens & Huettig
ATTORNEYS

United States Patent Office 2,909,102
Patented Oct. 20, 1959

2,909,102

GEAR MILLING MACHINE

Gerhard Rothe, Ettlingen, Baden, Germany, assignor to Maschinenfabrik Lorenz Aktiengesellschaft, Ettlingen, Baden, Germany, a German firm Application February 9, 1956, Serial No. 564,571

4 Claims. (Cl. 90—4)

The present invention relates to gear milling machines, and more particularly to improvements in the arbor supports of such machines for securing and relieving the arbor or mandrel holding a workpiece.

In gear milling machines in which the workpiece was mounted on a vertical arbor, it has been long known to support such work arbor at its upper end. This required a special stand or upright with a bracket which could be adjusted in a vertical direction to permit the work to be mounted and the work arbor then to be supported at its upper end. In order to reinforce such stand or upright and improve its rigidity, an additional crossarm or overarm has often been provided which connected such stand with the stronger upright supporting the milling carriage. Such crossarm was usually permanently secured to and formed a part of the upright supporting the milling carriage, while at the side facing the stand for the work arbor support, means were provided to clamp the crossarm to the stand after the machine had been adjusted to the desired diameter of the gear to be milled.

In other prior designs of milling machines, the crossarm was permanently secured to the stand for the work arbor support and adapted to be clamped to the main upright. In still another design the crossarm was bolted to both the main upright and the stand for the work arbor support. However, since in the latter construction the supporting bracket had to be shifted on its stand and thus did not form a rigid element, the work arbor was also not supported with sufficient rigidity. During milling operations with the known milling machines, the tilting moment which is exerted upon the stand for the work arbor support thus necessarily resulted in vibrations of the stand in the direction toward the milling tool. Furthermore, using such a prior machine for milling helical gears, an additional lateral pressure occurs which acts in a direction transverse to the aforementioned vibrations with a force of a size depending upon the angle of slope of the teeth which are being milled. Due to their construction, the known milling machines are incapable of taking up such pressure upon the upper end of the stand holding the work arbor support. Consequently, since such stand is only bolted at its base to the bed of the machine, it is bound to yield to such pressure. Thus, in these prior machines you not only had to contend with the springy vibrations in the direction toward the milling tool, but also with lateral vibrations. Such unsteady mounting, however, necessarily affects the working efficiency of the machine, as well as the accuracy of the tooth surfaces milled thereupon.

It is an object of the present invention to provide a milling machine which overcomes the above-mentioned disadvantages of prior machines.

Another object of the invention is to provide a milling machine which, aside from the upright or column supporting the milling carriage, is provided with a second upright at the other end of the machine bed, and to connect both uprights rigidly with each other by means of an overarm on which the upper end of the stand for the work arbor support may be clamped.

A further object of the invention is to provide a milling machine of the type as last described in which a bracket for supporting the work arbor may be mounted directly on the overarm if, for example, the large diameter of the gear to be milled does not permit the use of the stand on which the work arbor support is usually mounted.

Further objects, features, and advantages of the present invention will appear from the following detailed description thereof as well as from the accompanying diagrammatical drawings, in which—

Fig. 1 shows a side view of a gear milling machine according to the invention which is provided with a stand for the work arbor support; while Fig. 2 shows a side view of the same machine in which the stand for the work arbor support has been replaced by a supporting bracket which is mounted directly on the overarm.

Referring to the drawings, the gear milling machine according to the invention consists as usual of a machine bed or base 1 with a guideway 2 which carries a slide carriage 5 which may be fixed in position and supports a vertical work arbor 3 for holding the workpiece 4. The main column or upright 6 for supporting the vertical tool slide 7 is mounted at one end of base 1. The work slide 5 carries the usual stand 8 for the work arbor support which consists of a bracket 9 which may be adjusted on stand 8 in a vertical direction to mount the workpiece 4 on the work arbor 3 and then to support the latter.

The mechanism for driving the tool 10 and for indexing the workpiece 4 or 14 is made as conventional in machines of this type and has therefore not been illustrated.

According to the invention, the other end of the machine base 1 opposite to upright 6 is provided with a second upright 11 which is rigidly secured to base 1, for example, by bolts and extends downwardly to the foundation of the machine to which it is likewise secured, for example, by lag screws, not shown. A crossarm or overarm 12 connects the solid uprights 6 and 11 and forms with them a rigid unit.

The tilting moment which during the milling operation acts upon the arbor supporting stand 8 is therefore transmitted to the two solid uprights 6 and 11 through bracket 9 in a generally diagonally inclined direction to overarm 12. Since the overarm 12 by being secured to upright 11 prevents the stand 8, which, in turn, is solidly connected to overarm 12, from vibrating in the direction toward the milling tool the entire mounting structure is much more rigid and the workpiece secured much more steadily than could be achieved in any of the previous milling machines. The new machine design therefore permits a greater output, a more efficient operation, and a greater accuracy of the milling operation of the gears cut thereon. This is due to the fact that, after the machine has ben adjusted to the respective diameter of the gear 4, and after work slide 5 has been clamped tight on the guideway 2 and the arbor supporting stand 11 secured to the overarm 12, a rigid entity is produced which will entirely prevent the occurrence of any vibrations either in the direction toward the milling tool or transversely thereto.

If, as shown in Fig. 2, the diameter of the gears 14 to be cut should be so large as to prevent the use of the stand for the work arbor bracket and to require its removal from the machine, the new design of the machine offers the further great advantage that the work arbor 3 may even in such case be securely and rigidly supported at its upper end. This may be done according to the invention by providing a guideway in the lower surface of the overarm 12, on which a supporting bracket 13 may be slidably moved in a horizontal direction to the position required by the diameter of gear 14 in which it may then be securely clamped. To admit such lateral mounting of the guide bushing of bracket 13, the same may, for example, consist of two shells which may be taken apart for mounting and then be bolted or clamped together. In operation, the milling pressure will then be taken up by bracket 13 in a generally inclined direction to overarm 12 and transmitted to the two solid uprights 6 and 11. The rigidity, efficiency, and accuracy of operation of the machine when using such bracket support 13 will be similar to that when using the bracket stand 8, as shown in Fig. 1, and far superior to those of previous machines, and, due to the lack of vibrations during the milling operation, the gears milled thereon will have far more accurate surfaces than previously was possible.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A gear milling or hobbing machine comprising a machine base having a guideway thereon, a work slide on said guideway, a work arbor adapted to be mounted on said work slide, an upright at one side of said base, a milling or hob slide mounted on said upright, a second upright at the other side of said base, an overarm rigidly secured to both uprights, and arbor supporting means extending at least from said work arbor in a generally diagonally inclined direction to said overarm for holding the upper end of said work arbor.

2. A gear milling or hobbing machine comprising a machine base having a guideway thereon, a work slide on said guideway, a work arbor adapted to be mounted on said work slide, an upright at one side of said base, a milling or hob slide mounted on said upright, a second upright at the other side of said base, an overarm rigidly secured to both of said uprights, a stand secured to said base and to said overarm, and a bracket mounted on said stand for supporting said work arbor near its upper end.

3. A gear milling or hobbing machine comprising a machine base having a guideway thereon, a work slide on said guideway, a work arbor adapted to be mounted on said work slide, an upright at one side of said base, a milling or hob slide mounted on said upright, a second upright at the other side of said base, an overarm rigidly secured to both of said uprights, and a bracket extending in a generally inclined direction and secured to said overarm and said work arbor for supporting said work arbor near its upper end.

4. A gear milling or hobbing machine comprising a machine base having a guideway thereon, a work slide on said guideway, a work arbor adapted to be mounted on said work slide, an upright at one side of said base, a milling or hob slide mounted on said upright, a second upright at the other side of said base, an overarm rigidly secured to both of said uprights, a stand secured to said work slide between said work arbor and said second upright and to said overarm, and a bracket mounted on said stand for supporting said work arbor near its upper end.

References Cited in the file of this patent

UNITED STATES PATENTS

| | | |
|---|---|---|
| 2,080,207 | Hoppe | May 11, 1937 |
| 2,412,337 | Jackson | Dec. 10, 1946 |
| 2,671,233 | Marchant et al. | Mar. 9, 1954 |
| 2,690,701 | Zimmermann et al. | Oct. 5, 1954 |

FOREIGN PATENTS

| | | |
|---|---|---|
| 92,193 | Switzerland | Dec. 16, 1921 |
| 415,079 | Italy | Sept. 18, 1946 |